March 14, 1933.    R. J. LOUVIAUX    1,901,463
APPARATUS FOR HANDLING GLASS SHEETS
Filed May 14, 1932
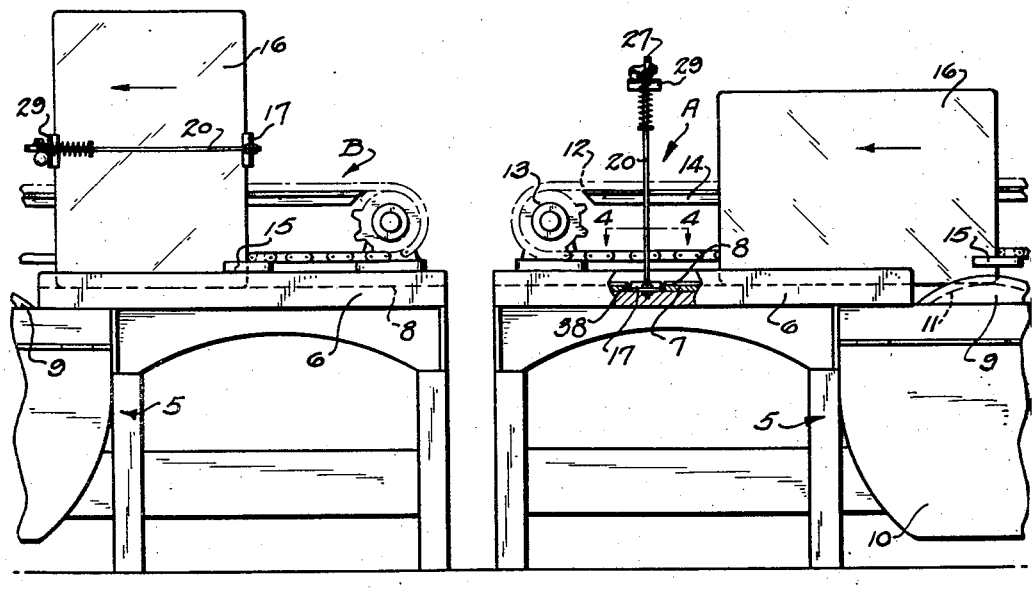
Fig. 1.
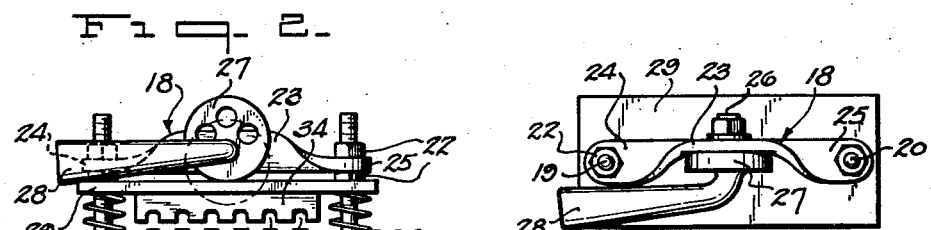
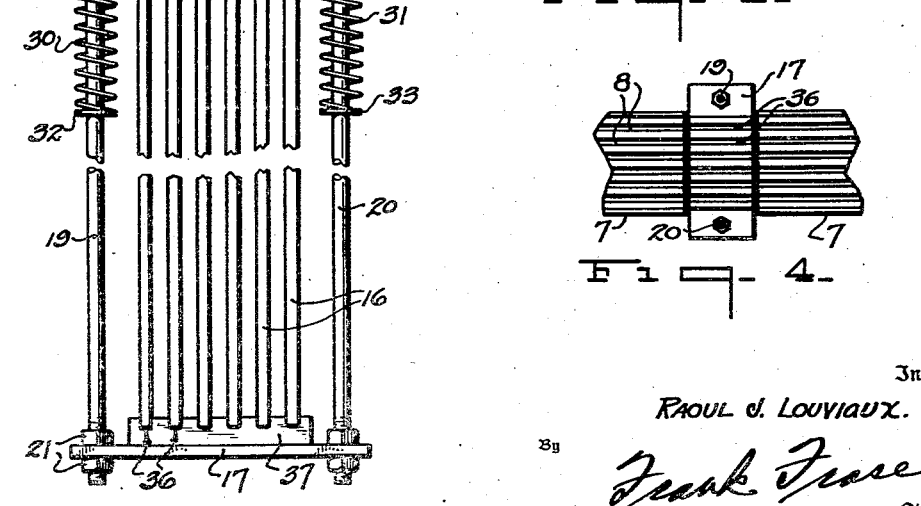
Inventor
RAOUL J. LOUVIAUX.
By Frank Fraser
Attorney Patented Mar. 14, 1933

1,901,463

UNITED STATES PATENT OFFICE

RAOUL J. LOUVIAUX, OF TOLEDO, OHIO, ASSIGNOR TO LIBBEY-OWENS-FORD GLASS COMPANY, OF TOLEDO, OHIO, A CORPORATION OF OHIO

APPARATUS FOR HANDLING GLASS SHEETS

Application filed May 14, 1932. Serial No. 611,379.

The present invention relates broadly to sheet glass edging machines and more particularly to means for transferring the glass sheets from the discharge end of one edging machine to the receiving end of the same or a second edging machine.

In the glass surfacing art, it is customary to employ a continuous type of machine for the grinding and/or polishing of the edges of glass sheets. Broadly stated, with such a machine, a plurality of glass sheets are simultaneously ground and polished by supporting them side by side in a substantially vertical position and passing them in a definite substantially horizontal path continuously over and in engagement with a series of rotatable grinding and polishing elements usually in the form of grooved wheels. During the travel of the glass sheets through the machine, the lower edges thereof, which engage the grinding and polishing wheels, are of course first ground and then polished. As the sheets reach the discharge end of the machine, they are removed therefrom and transferred either to the forward or receiving end of the same machine or a second machine. During this transfer of the glass sheets, they are turned so as to present another edge for grinding and polishing, after which they are again moved through the machine. This cycle of operations may be repeated until all four edges or any desired number of edges of the glass sheets have been ground and polished.

The principal aim and object of this invention resides in the provision of improved means whereby a plurality of glass sheets may be transferred simultaneously from the discharge end of one machine to the receiving end of the same or a second machine and, during such transfer, turned so as to present another edge to be treated.

Another important object of the invention resides in the provision of an apparatus or device of novel and improved construction by means of which the glass sheets may be transferred from the discharge end of one machine to the receiving end of the same or a second machine both rapidly and conveniently and in a practical and efficient manner.

Other objects and advantages of the invention will become more apparent during the course of the following description when taken in connection with the accompanying drawing.

In the drawing forming a part of this application and wherein like numerals are employed to designate like parts throughout the same.

Fig. 1 is a side elevation of the rear or discharge end of one machine, partially in section, and the forward or receiving end of a second machine showing the present invention in operative relation therewith.

Fig. 2 is an elevation of the improved sheet transfer apparatus or device constructed in accordance with the present invention.

Fig. 3 is a plan view thereof, and

Fig. 4 is a detail section taken substantially on line 4—4 of Fig. 1.

Referring now more particularly to the drawing, there is designated in its entirety by the letter A in Fig. 1 the rear or discharge end of one sheet glass edging machine, while B designates the forward or receiving end of a second edging machine. While the two machines A and B have been shown as positioned in substantial alignment with one another, it will of course be appreciated that these machines may be arranged side by side or at right angles with respect to one another as desired. However, it is preferred that the discharge end of one machine be disposed in relatively close proximity to the receiving end of the other machine so as to facilitate the transfer of the glass sheets from the first machine to the second machine. It is also to be understood that the present invention is not restricted to use in connection with any specific type of edging machine.

Each of the edging machines A and B, however, is preferably of that type wherein a plurality of sheets of glass to be edged are adapted to be vertically disposed side by side in spaced relation relative to one another and passed in a substantially horizontal path over and in contact with a plurality of successive grinding and/or polishing wheels. Thus, each machine includes briefly a supporting framework 5 upon which is carried a plurality of horizontally arranged channel members 6 (only one being shown), having positioned therein the supporting runways 7 longitudinally grooved as at 8. Also carried by the framework 5 are a plurality of grinding and/or polishing wheels 9, only one of which has been shown. However, each surfacing wheel is adapted to be rotated within a receptacle 10 containing a suitable abrasive material and may be driven by any suitable means. The upper portion of each surfacing wheel 9 is received within an opening between two adjacent channel members 6, and each wheel is provided with one or more grooves 11 around the periphery thereof. These grooves are in substantial horizontal alignment with the grooves 8 in runways 7. The particular construction of the surfacing wheels, together with the mounting and drive therefor, have not been illustrated specifically since they constitute no part of the present invention per se.

Mounted above the runways 7 is an endless sprocket chain 12 trained at each end of its loop about a sprocket 13, the upper run or flight of the chain being supported upon and slidable over a stationary supporting member or table 14. The upper edges of the side portions of the channel members 6 constitute guide rails along which pusher blocks 15 are adapted to slide, these pusher blocks being suitably connected with and driven forwardly by the lower run or flight of sprocket chain 12. The pusher blocks are preferably provided with a plurality of slots within which the rear vertical edges of the glass sheets 16 fit so that the said pusher blocks therefore serve to advance the glass sheets forwardly in the direction indicated by the arrow in Fig. 1.

The glass sheets 16 are shown as being rectangular and during the surfacing operation a plurality of these sheets are first stood on edge side by side upon one of the runways 7 at the forward end of machine A, being maintained in properly spaced relation by the pusher block 15. Upon driving of the sprocket chain 12, the pusher block will serve to advance the sheets forwardly over the successive surfacing wheels 9. As the sheets reach the discharge end of machine A, they are removed therefrom and transferred either to the forward or receiving end of the same machine or to the receiving end of machine B. During the transfer of the glass sheets from machine A to machine B, the said sheets are of course turned so as to present another edge for grinding and polishing, after which they are moved through the machine B to finish said second edge.

The principal aim and object of this invention resides in the provision of novel and improved means for transferring a plurality of the glass sheets 16 simultaneously from the discharge end of machine A to the receiving end of the same machine or to the receiving end of machine B. The transfer means herein provided consists of a device including in its construction a stationary rectangular bottom member or plate 17 and a stationary upper member 18, said bottom plate and upper member being connected together in fixed spaced relation relative to one another by means of the two connecting rods 19 and 20. These rods 19 and 20 pass through and are secured to the bottom plate 17 by nuts 21 and to the upper member 18 by nuts 22. The upper member is formed with a substantially flat vertically disposed central portion 23, while the opposite ends thereof are turned at substantially right angles to the central portion to provide horizontal ears 24 and 25 through which the connecting rods 19 and 20 respectively pass. Pivotally connected to the central portion 23 of member 18, as at 26, is an eccentric or cam 27 and carried by this cam is an operating handle or lever 28 by means of which the said cam may be rotated about its pivot point 26.

Slidably mounted upon the connecting rods 19 and 20, inwardly of member 18, is a plate 29 movable toward and away from the bottom plate 17. However, the plate 29 is normally urged away from plate 17 by means of the compression springs 30 and 31 encircling rods 19 and 20 respectively, said springs bearing at one end against the plate 29 and at their opposite ends against the collars 32 and 33 fixed to rods 19 and 20.

The movable plate 29 carries upon its inner surface a block 34 formed with a plurality of grooves 35 within which the upper edges of the glass sheets 16 are adapted to be received, the lower edges of the glass sheets being received within similar grooves 36 formed in a block 37 secured to the inner surface of base plate 17.

In accordance with the present invention, the channel member 6 and runway 7 at the rear or discharge end of each machine A and B are cut away as indicated at 38 in Fig. 1, and when it is desired to transfer a plurality or group of glass sheets 16 from the discharge end of machine A to the receiving end thereof or to the receiving end of machine B, the transfer device is adapted to be removably associated with machine A. More specifically, the transfer device is adapted to be arranged in a vertical position with the bottom plate 17 thereof received within the cut away portion 38 of runway 7. When so positioned, the grooves 36 in block 37 are adapted to be in alignment with the grooves 8 in runway 7. After the transfer device has been fitted into the runway, as described above, the lever 28 is swung to the left as shown in Fig. 2 so that the plate 29 will be urged upwardly away from plate 17 by the compression springs 30 and 31, whereupon the distance between the upper and lower clamping blocks 34 and 37 respectively will be relatively greater than the height of the glass sheets 16 to the end that the said sheets can be moved by the pusher block 15 along the runway 7 and over the bottom plate 17. When the glass sheets are moved to a desired position, the operator swings the handle 28 to the right whereupon the cam 27 will act to move the plate 29 downwardly against the action of springs 30 and 31 so as to cause the upper block 34 to engage the upper edges of the glass sheets, and of course when this is done the glass sheets will be firmly clamped between the clamping blocks 34 and 37.

While holding the sheets thus clamped, the operator can remove the said sheets simultaneously from the machine A and transfer them either to the receiving end of the same machine or the receiving end of machine B as shown in Fig. 1. During the transfer of the glass sheets, the operator turns the sheets ninety degrees and places them upon the runway 7 at the forward end of machine B. The handle 28 is then again swung to the left whereupon the clamping block 34 will again be moved out of engagement with the glass sheets and the transfer device can then be easily and quickly removed from the sheets. The pusher block 15 is then moved to engage the rear edges of the sheets and to advance the said sheets forwardly through the machine B to grind and/or polish the lower edges thereof. This cycle of operations can be repeated until all four or any desired number of edges of the sheets have been surfaced.

During the transferring of the glass sheets, the said sheets will of course be maintained in properly spaced relation relative to one another due to the fact that the opposite edges thereof are received within the grooves in the clamping blocks 34 and 37. From the above, it will be readily apparent that by means of the present invention, a plurality of glass sheets can be transferred simultaneously from the discharge end of one machine to the receiving end of the same or a second machine and at the same time turned to present another edge to be surfaced. This can be effected both rapidly and conveniently and obviates the necessity of transferring the individual sheets one at a time.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A device for transferring a plurality of sheets of glass simultaneously from the discharge end of one edging machine to the receiving end of the same or a second edging machine, comprising a stationary member, a second member spaced from the stationary member and movable toward and away from the same, means for moving said movable member toward said stationary member to clamp a plurality of glass sheets therebetween, and means carried by the stationary and movable members for maintaining the sheets in properly spaced relation relative to one another.

2. A device for transferring a plurality of sheets of glass simultaneously from the discharge end of one edging machine to the receiving end of the same or a second edging machine, comprising a stationary member, a second member spaced from the stationary member and movable toward and away from the same, means for normally urging the movable member away from the stationary member, means for moving said movable member toward said stationary member to clamp a plurality of glass sheets therebetween, and means carried by the stationary and movable members for maintaining the sheets in properly spaced relation relative to one another.

3. A device for transferring a plurality of sheets of glass simultaneously from the discharge end of one edging machine to the receiving end of the same or a second edging machine, comprising a stationary member, a second member spaced from the stationary member and movable toward and away from the same, means for connecting the stationary and movable members together, means carried by said connecting means for moving said movable member toward said stationary member to clamp a plurality of glass sheets therebetween, and means carried by the stationary and movable members for maintaining the sheets in properly spaced relation relative to one another.

4. A device for transferring a plurality of sheets of glass simultaneously from the discharge end of one edging machine to the receiving end of the same or a second edging machine, comprising a stationary member, a second member spaced from the stationary member and movable toward and away from the same, means for connecting the stationary and movable members together, means carried by the connecting means for normally urging the movable member away from the stationary member, means also carried by the connecting means for moving said movable member toward said stationary member to clamp a plurality of glass sheets therebetween, and means carried by the stationary and movable members for maintaining the sheets in properly spaced relation relative to one another.

5. A device for transferring a plurality of sheets of glass simultaneously from the discharge end of one edging machine to the receiving end of the same or a second edging machine, comprising a stationary member, a second member spaced from the stationary member and movable toward and away from the same, a plurality of rods connected to the stationary member and upon which the movable member is slidably mounted, means also carried by the rods outwardly of said movable member for moving the same toward the stationary member to clamp a plurality of glass sheets therebetween, and means carried by said stationary and movable members for maintaining the sheets in properly spaced relation relative to one another.

6. A device for transferring a plurality of sheets of glass simultaneously from the discharge end of one edging machine to the receiving end of the same or a second edging machine, comprising a stationary member, a second member spaced from the stationary member and movable toward and away from the same, a plurality of rods connected to the stationary member and upon which the movable member is slidably mounted, spring means encircling the rods and acting to normally urge the movable member away from the stationary member, means carried by said rods outwardly of said movable member for moving the same toward the stationary member to clamp a plurality of glass sheets therebetween, and means carried by said stationary and movable members for maintaining the sheets in properly spaced relation relative to one another.

7. A device for transferring a plurality of sheets of glass simultaneously from the discharge end of one edging machine to the receiving end of the same or a second edging machine, comprising a stationary member, a second member spaced from the stationary member and movable toward and away from the same, a plurality of rods connected to the stationary member and upon which the movable member is slidably mounted, spring means encircling the rods and acting to normally urge the movable member away from the stationary member, cam means carried by said rods outwardly of said movable member for moving the same toward the stationary member to clamp a plurality of glass sheets therebetween and means carried by said stationary and movable members and having grooves for receiving the opposite edges of the glass sheets therein whereby to maintain the said sheets in properly spaced relation relative to one another.

8. The combination with an edging machine including a grooved runway at the discharge end thereof and along which a plurality of glass sheets arranged side by side are adapted to be moved, said runway being cut away at a point intermediate its ends, of a device for transferring the plurality of sheets simultaneously from the runway to the receiving end of the same or a second edging machine, including a stationary base member adapted to fit within the cut-away portion of the runway and being formed with a plurality of grooves arranged in alignment with the grooves of said runway, an upper member movable toward and away from the base member, and means for moving the upper member toward the base member to clamp the glass sheets therebetween.

9. The combination with an edging machine including a grooved runway at the discharge end thereof and along which a plurality of glass sheets arranged side by side are adapted to be moved, said runway being cut away at a point intermediate its ends, of a device for transferring the plurality of sheets simultaneously from the runway to the receiving end of the same or a second edging machine, including a stationary base member adapted to fit within the cut-away portion of the runway and being formed with a plurality of grooves arranged in alignment with the grooves of said runway, an upper member movable toward and away from the base member, means for normally urging the upper member away from the base member, and means for moving said upper member toward said base member to clamp the glass sheets therebetween.

10. The combination with an edging machine including a grooved runway at the discharge end thereof and along which a plurality of glass sheets arranged side by side are adapted to be moved, said runway being cut away at a point intermediate its ends, of a device for transferring the plurality of sheets simultaneously from the runway to the receiving end of the same or a second edging machine, including a stationary base member adapted to fit within the cut-away portion of the runway and being formed with a plurality of grooves arranged in alignment with the grooves of said runway, an upper member movable toward and away from the base member, means for connecting the base member and upper member together, and means carried by said connecting means for moving said upper member toward said base member to clamp the glass sheets therebetween.

11. The combination with an edging machine including a grooved runway at the discharge end thereof and along which a plurality of glass sheets arranged side by side are adapted to be moved, said runway being cut away at a point intermediate its ends, of a device for transferring the plurality of sheets simultaneously from the runway to the receiving end of the same or a second edging machine, including a stationary base member adapted to fit within the cut-away portion of the runway and being formed with a plurality of grooves arranged in alignment with the grooves of said runway, an upper member movable toward and away from the base member, means for connecting the base member and upper member together, means carried by the connecting means for normally urging the upper member away from the base member, and means also carried by the connecting means for moving said upper member toward said base member to clamp the glass sheets therebetween.

12. The combination with an edging machine including a runway at the discharge end thereof and along which a plurality of glass sheets arranged side by side are adapted to be moved, said runway being cut away at a point intermediate its ends, of a device for transferring the plurality of sheets simultaneously from the runway to the receiving end of the same or a second edging machine, including a base member adapted to fit within the cut-away portion of the runway, an upper member spaced above said base member, means for connecting said members together, and means for effecting relative movement between the members to clamp the glass sheets therebetween.

13. The combination with an edging machine including a runway at the discharge end thereof and along which a plurality of glass sheets arranged side by side are adapted to be moved, said runway being cut away at a point intermediate its ends, of a device for transferring the plurality of sheets simultaneously from the runway to the receiving end of the same or a second edging machine, including a base member adapted to fit within the cut-away portion of the runway, an upper member spaced above said base member, means for connecting said members together, means for effecting relative movement between the members to clamp the glass sheets therebetween, and means carried by the said members for maintaining the sheets in properly spaced relation relative to one another.

Signed at Toledo, in the county of Lucas and State of Ohio, this 12th day of May 1932.

RAOUL J. LOUVIAUX.